(12) United States Patent
Hollowell et al.

(10) Patent No.: US 11,407,388 B2
(45) Date of Patent: Aug. 9, 2022

(54) ELECTROMECHANICAL PARK BRAKE STRATEGY FOR TRANSMISSION PARK PAWL ENGAGEMENT

(71) Applicants: James R Hollowell, Brownstown, MI (US); Zachary Rogalski, Rochester Hills, MI (US)

(72) Inventors: James R Hollowell, Brownstown, MI (US); Zachary Rogalski, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 572 days.

(21) Appl. No.: 16/437,758

(22) Filed: Jun. 11, 2019

(65) Prior Publication Data

US 2020/0391707 A1    Dec. 17, 2020

(51) Int. Cl.

| | |
|---|---|
| *B60T 7/00* | (2006.01) |
| *B60W 10/00* | (2006.01) |
| *B60T 7/12* | (2006.01) |
| *B60W 10/18* | (2012.01) |
| *B60W 30/18* | (2012.01) |
| *F16H 63/34* | (2006.01) |
| *F16H 61/22* | (2006.01) |

(52) U.S. Cl.
CPC ............ *B60T 7/12* (2013.01); *B60W 10/182* (2013.01); *B60W 30/18109* (2013.01); *F16H 63/3483* (2013.01); *F16H 2061/223* (2013.01)

(58) Field of Classification Search
None
See application file for complete search history.

(56) References Cited

U.S. PATENT DOCUMENTS

| | | | |
|---|---|---|---|
| 6,311,808 B1 * | 11/2001 | Halasy-Wimmer | B60R 25/08 188/106 F |
| 7,600,827 B2 | 10/2009 | Tamai et al. | |
| 7,641,291 B2 | 1/2010 | Streit et al. | |
| 2012/0191311 A1 | 7/2012 | Mohile et al. | |
| 2018/0043895 A1 * | 2/2018 | Shami | B60T 8/17555 |

* cited by examiner

*Primary Examiner* — Truc M Do
(74) *Attorney, Agent, or Firm* — Ralph E. Smith

(57) ABSTRACT

Park control systems and methods operate such that, in response to a request to engage or disengage a park pawl of a vehicle park pawl system, a controller commands a hydraulic brake system to maintain a hydraulic brake pressure therein generated in response to depression of a brake pedal by a driver of the vehicle, when vehicle movement is detected after maintaining the hydraulic brake pressure, commands a vacuum-independent electric brake booster to generate and provide additional hydraulic brake pressure to the hydraulic brake system, commands the park pawl system to engage or disengage the park pawl to/from a transmission output shaft, and after the park pawl is engaged or disengaged to/from the transmission output shaft, commands the hydraulic brake system to release its hydraulic pressure at a defined rate.

20 Claims, 2 Drawing Sheets

ELECTROMECHANICAL PARK BRAKE STRATEGY FOR TRANSMISSION PARK PAWL ENGAGEMENT

FIELD

The present application generally relates to vehicle park pawl systems and, more particularly, to an electromechanical park brake strategy for transmission park pawl engagement.

BACKGROUND

A vehicle typically comprises multiple park and brake systems, including hydraulic wheel brakes (e.g., four wheel disc brakes), an electric park brake, and a park pawl system for a transmission (e.g., an automatic transmission). The electric park brake only operates at one axle of the vehicle to apply a braking force to two wheels (e.g., the rear wheels). The park pawl system engages a park pawl to a shaft of the transmission to lock up the transmission when shifted into park. Because there is an inherent latency or delay by the electric motor(s) of the park pawl system, the vehicle could briefly roll (e.g., on a grade or hill) before the park pawl is engaged or disengaged. This results in harsh park pawl engagement/disengagement, which could be noticeable to a driver of the vehicle. This harsh park pawl engagement/disengagement could also potentially damage the park pawl system over time. Accordingly, while such conventional vehicle systems work well for their intended purpose, there remains a need for improvement in the relevant art.

SUMMARY

According to one example aspect of the invention, a park control system for a vehicle having a torque generating system and a transmission coupled to a driveline is presented. In one exemplary implementation, the system comprises: a hydraulic brake system configured to apply braking force at each of four wheels of the driveline using a hydraulic brake pressure generated in response to depression of a brake pedal by a driver of the vehicle, a vacuum-independent electric brake booster configured to generate and provide additional hydraulic brake pressure to the hydraulic brake system, a park pawl system comprising an actuator configured to engage and disengage a park pawl to/from an output shaft of the transmission, and a controller configured to detect a request to engage or disengage the park pawl system and, in response to detecting the request: command the hydraulic brake system to maintain its hydraulic brake pressure, when vehicle movement is detected after maintaining the hydraulic brake pressure, command the electric brake booster to generate and provide additional hydraulic brake pressure to the hydraulic brake system, command the park pawl system to engage or disengage the park pawl to/from the transmission output shaft, and after the park pawl is engaged or disengaged to/from the transmission output shaft, command the hydraulic brake system to release its hydraulic brake pressure at a defined rate.

In some implementations, the controller is configured to command the hydraulic brake system to release its hydraulic brake pressure in the at a defined rate based on at least one of (i) whether the torque generating system is generating drive torque and (ii) a grade of a surface on which the vehicle resides. In some implementations, the controller is configured to command the hydraulic brake system to release its hydraulic brake pressure at the defined rate when the torque generating system is not generating drive torque and the grade is less than a grade threshold. In some implementations, the grade threshold is approximately 5 percent.

In some implementations, the controller is further configured to command the hydraulic brake system to maintain its hydraulic brake pressure for a period prior to commanding the hydraulic brake system to release its hydraulic brake pressure at the defined rate when the torque generating system is generating drive torque and the grade is less than the grade threshold. In some implementations, the vehicle further comprises an electric park brake (EPB) configured to apply braking force at two of four wheels of the driveline, and wherein the controller is further configured to command the EPB to apply braking force at the two of the four wheels of the vehicle prior to commanding the hydraulic brake system to release its hydraulic brake pressure at the defined rate when the grade is greater than the grade threshold.

In some implementations, the torque generating system comprises an engine and the determination of whether the torque generating system is generating drive torque comprises determining whether the engine is operating above an engine speed threshold. In some implementations, the engine speed threshold is approximately 500 revolutions per minute. In some implementations, the controller is further configured to detect a set of preconditions in connection with detecting the request to engage or disengage the park pawl system, the set of preconditions comprising driver input via the brake pedal, driver input via a transmission gear selector specifying a shift into or out of park, and vehicle speed below a vehicle speed threshold. In some implementations, the vehicle speed threshold is approximately two kilometers per hour.

According to another example aspect of the invention, a park control method for a vehicle having a torque generating system and a transmission coupled to a driveline is presented. In one exemplary implementation, the method comprises: detecting, by a controller of the vehicle, a request to engage or disengage a park pawl system comprising an actuator configured to engage and disengage a park pawl to/from an output shaft of the transmission and in response to detecting the request: commanding, by the controller, a hydraulic brake system to maintain a hydraulic brake pressure therein generated in response to depression of a brake pedal by a driver of the vehicle, wherein the hydraulic brake system is configured to apply braking force at each of four wheels of the driveline using the hydraulic brake pressure, when vehicle movement is detected after maintaining the hydraulic brake pressure, commanding, by the controller, a vacuum-independent electric brake booster to generate and provide additional hydraulic brake pressure to the hydraulic brake system, commanding, by the controller, the park pawl system to engage or disengage the park pawl to/from the transmission output shaft, and after the park pawl is engaged or disengaged to/from the transmission output shaft, commanding, by the controller, the hydraulic brake system to release its hydraulic pressure at a defined rate.

In some implementations, commanding the hydraulic brake system to release its hydraulic brake pressure in the at a defined rate is based on at least one of (i) whether the torque generating system is generating drive torque and (ii) a grade of a surface on which the vehicle resides. In some implementations, commanding the hydraulic brake system to release its hydraulic brake pressure at the defined rate is performed when the torque generating system is not generating drive torque and the grade is less than a grade threshold. In some implementations, the grade threshold is approximately 5 percent.

In some implementations, the method further comprises commanding, by the controller, the hydraulic brake system to maintain its hydraulic brake pressure for a period prior to commanding the hydraulic brake system to release its hydraulic brake pressure at the defined rate when the torque generating system is generating drive torque and the grade is less than the grade threshold. In some implementations, the vehicle further comprises an EPB configured to apply braking force at two of four wheels of the driveline, and further comprising commanding, by the controller, the EPB to apply braking force at the two of the four wheels of the vehicle prior to commanding the hydraulic brake system to release its hydraulic brake pressure at the defined rate when the grade is greater than the grade threshold.

In some implementations, the torque generating system comprises an engine and the determination of whether the torque generating system is generating drive torque comprises determining whether the engine is operating above an engine speed threshold. In some implementations, the engine speed threshold is approximately 500 revolutions per minute. In some implementations, the method further comprises detecting, by the controller, a set of preconditions in connection with detecting the request to engage or disengage the park pawl system, the set of preconditions comprising driver input via the brake pedal, driver input via a transmission gear selector specifying a shift into or out of park, and vehicle speed below a vehicle speed threshold. In some implementations, the vehicle speed threshold is approximately two kilometers per hour.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, a vehicle typically comprises multiple park and brake systems including hydraulic wheel brakes (e.g., four wheel disc brakes), an electric park brake (EPB), and a park pawl system for a transmission. Conventional vehicle park and brake systems often suffer from harsh park pawl engagement and/or disengagement during certain scenarios, such as parking on a grade or hill. Accordingly, improved vehicle park and brake systems and control methods are presented. These techniques utilize a vacuum-independent electric brake booster configured to generate additional hydraulic brake pressure in the vehicle's hydraulic brake system. This electric brake booster is vacuum-independent in that it does not require engine vacuum to operate. Depending on various operating parameters, the electric brake booster generates additional hydraulic brake pressure to hold the vehicle stationary until park pawl engagement/disengagement is fully completed, after which the hydraulic brake pressure is released at a defined rate. Depending on vehicle torque generation and vehicle grade, the EPB could also be pre-applied or the hydraulic brake pressure could be held for an additional period.

Figure 1:
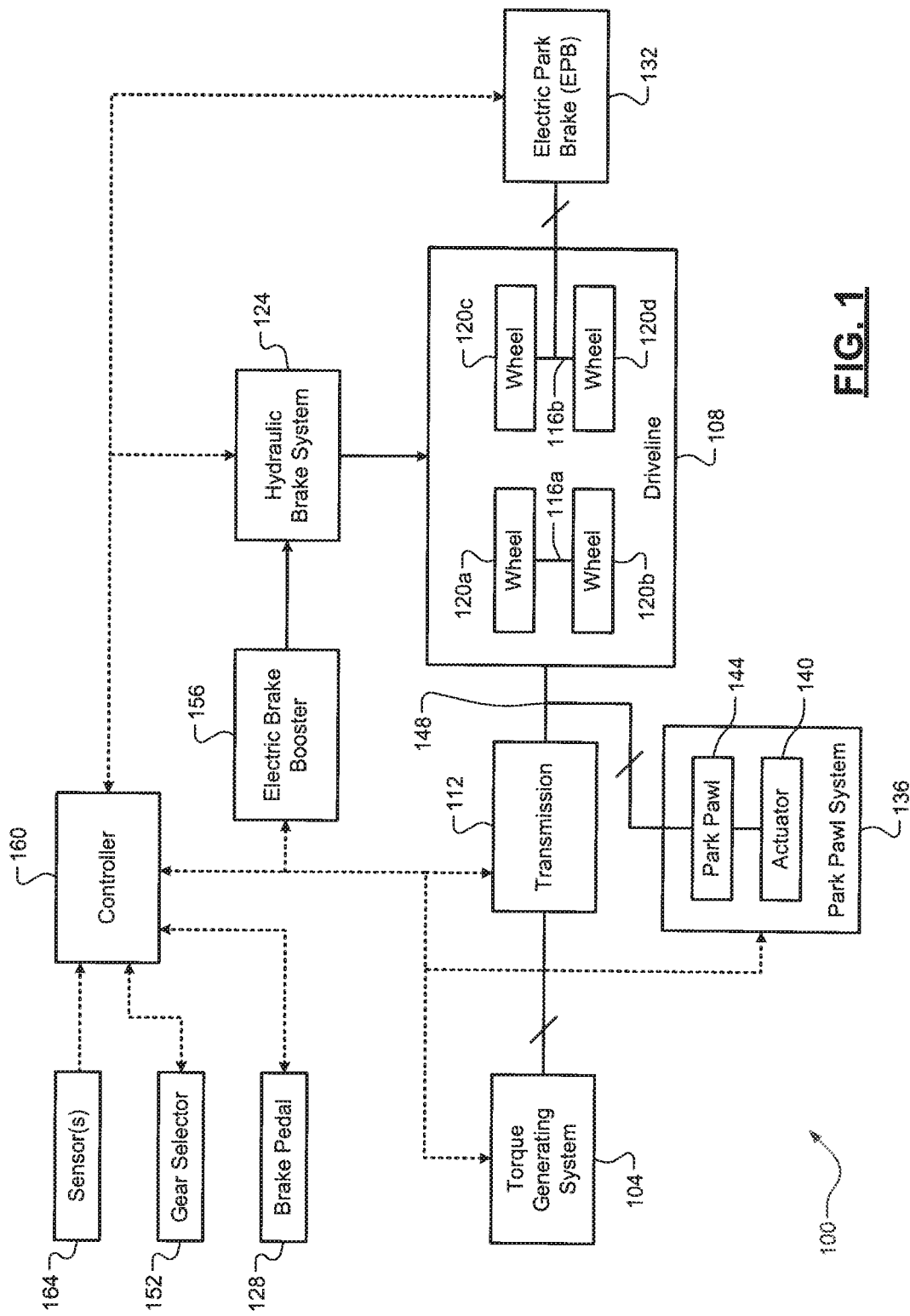
FIG. 1 is a functional block diagram of an example vehicle having a park control system according to at least some of the principles of the present disclosure.

Referring now to FIG. 1, a functional block diagram of an example vehicle 100 according to at least some of the principles of the present disclosure is illustrated. The vehicle 100 comprises a torque generating system 104 (e.g., an internal combustion engine, an electric motor, or combinations thereof) configured to generate drive torque that is transferred to a driveline 108 via a transmission 112. The driveline 108 generally comprises two axles 116a, 116b and four wheels 120a, 120b, 120c, and 120d (collectively, "wheels 120"), but it will be appreciated that there could be additional axles and/or wheels. A hydraulic brake system 124 applies a braking force to each of the wheels 120 using hydraulic brake pressure generated in response to driver input via a brake pedal 128 (e.g., either directly or in response to an electronic signal). An EPB 132 also applies a braking force to two of the four wheels 120 (e.g., the rear wheels of the vehicle 100). A park pawl system 136 comprising an actuator 140 (e.g., an electric motor) and a park pawl 144 selectively engages or disengages the park pawl 144 to an output shaft 148 (e.g., a toothed wheel (not shown) coupled to the output shaft 148) of the transmission 112 to lock up the transmission 112, e.g., in response to a shift into park via a transmission gear selector 152.

A vacuum-independent electric brake booster 156 generates additional hydraulic brake pressure for the hydraulic brake system 124 (independent of system vacuum, such as engine vacuum), which can be used to apply additional braking force to each of the wheels 120. A controller 160 controls operation of the vehicle 100, including controlling the torque generating system 104 to generate a desired drive torque in response to driver input (e.g., via an accelerator pedal, not shown), controlling the transmission 112 to shift into a desired gear in response to driver input (e.g., via the transmission gear selector 152), and controlling the various brake and park systems described above (the hydraulic brake system 124, the EPB 132, the park pawl system 136, and the electric brake booster 156. The controller 160 also receives inputs indicative of vehicle operating parameters from a set of one or more sensors 164. For example, the vehicle operating parameters could be a grade of a surface that the vehicle 100 is currently on, as well as other suitable parameters such as vehicle speed. The specific control techniques performed by the controller 160 will now be described in greater detail.

Figure 2:
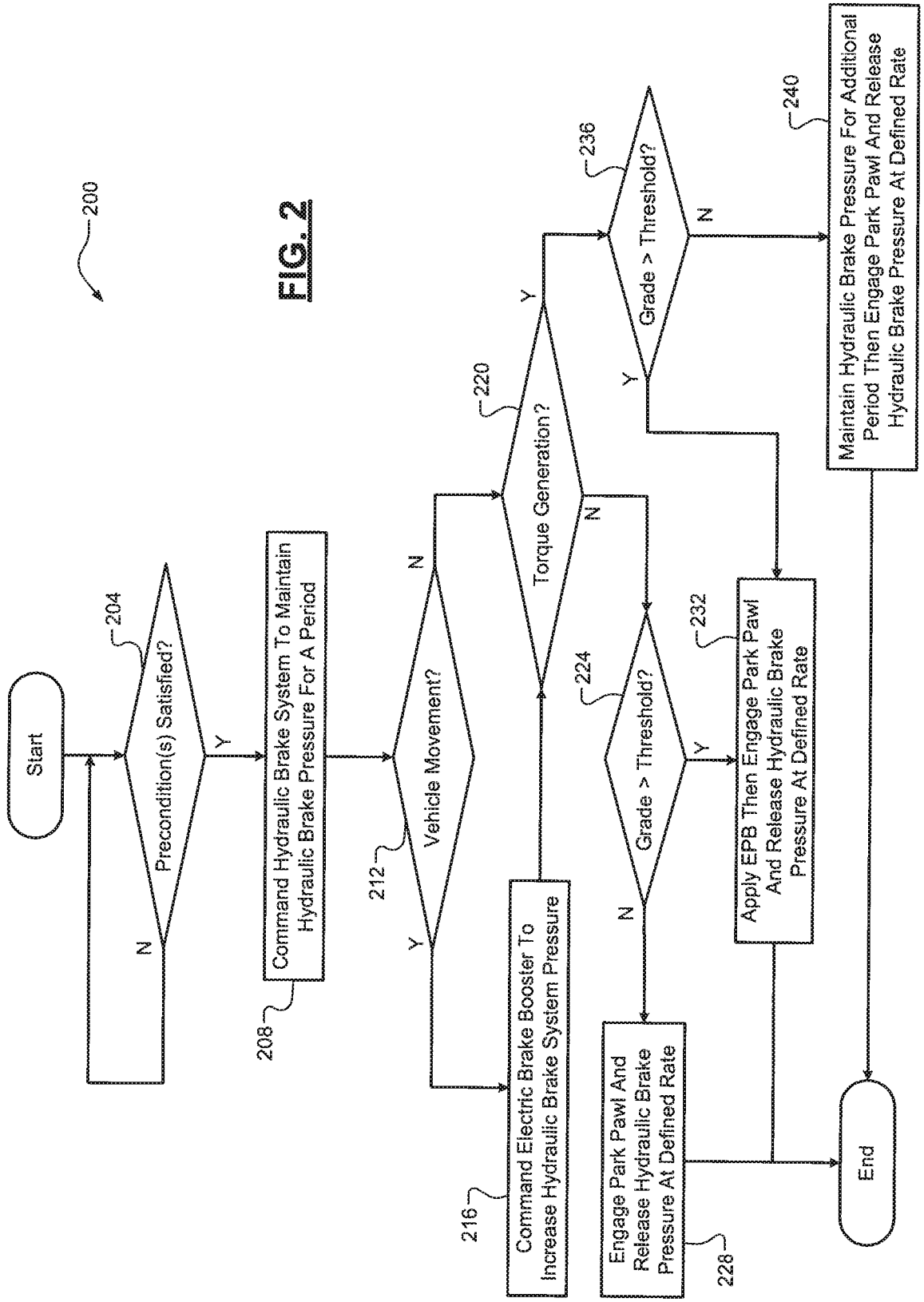
FIG. 2 is a flow diagram of an example park control method according to at least some of the principles of the present disclosure.

Referring now to FIG. 2 and with continued reference to FIG. 1, a flow diagram of a park control method 200 according to at least some the principles of the present disclosure is illustrated. At 204, the controller 160 determines whether a set of one or more preconditions for the method 200 have been satisfied. This could include, for example only, driver input being provided via the brake pedal 128 (e.g., driver foot at least partially depressing the brake pedal 128), driver input via a transmission gear selector 152 that specifies a shift into or out of park (e.g., setting a shift lever or rotary knob into or out of "P"), and vehicle speed below a vehicle speed threshold. It will be appreciated that less or more preconditions could be required. In one exemplary implementation, the vehicle speed threshold is approximately 2 kilometers per hour, but it will be appreciated that any suitable threshold value could be utilized. When the precondition(s) have been satisfied, the method 200 proceeds to 208. Otherwise, the method 200 ends or returns to 204 until the precondition(s) have been satisfied.

At 208, the controller 160 commands the hydraulic brake system 124 to maintain hydraulic brake pressure therein for a period. This could be a current level of hydraulic brake pressure or some other predetermined or calculated level of hydraulic brake pressure. At 212, the controller 160 determines whether vehicle movement occurs while the hydraulic brake pressure is being maintained. This could be determined, for example, based on the vehicle speed as measured by sensor(s) 164. When vehicle movement is detected, the controller 160 commands the electric brake booster 156 to generate additional hydraulic brake pressure for the hydraulic brake system 124 or, in other words, to increase the hydraulic brake pressure in the hydraulic brake system 124, and the method 200 then proceeds to 220. When no vehicle movement is detected at 212, however, the method 200 proceeds directly to 220. At 220, the controller 160 determines whether the torque generating system 104 is currently generating drive torque that could potentially cause vehicle movement. For a torque generating system 104 that comprises an engine, this could include, for example only, determining whether the engine speed is greater than an engine speed threshold. In one exemplary implementation, the engine speed threshold is approximately 500 revolutions per minute, but it will be appreciated that any suitable threshold value could be utilized.

When torque generation is not detected at 220, the method 200 proceeds to 224. When torque generation is detected at 220, however, the method 200 proceeds to 236, which will be discussed in greater detail below. At 224, the controller 160 determines whether a grade of a surface on which the vehicle 100 currently resides is greater than a grade threshold. This determination could be made, for example, using an accelerometer or other one of the sensor(s) 164. In one exemplary implementation, the grade threshold is approximately 5%, but it will be appreciated that any suitable grade threshold could be utilized. When the grade does not exceed the grade threshold, the method 200 proceeds to 228. When the grade does exceed the grade threshold, however, the method 200 proceeds to 232. At 228, the controller 160 commands the park pawl system 136 to engage or disengage the park pawl 144 to lock up the transmission 112 and then the controller 160 commands the hydraulic brake system 124 to release its hydraulic brake pressure at a defined rate. This defined rate could be, for example, a linear rate, a two-step linear rate, or a variable rate. The method 200 then ends or returns to 204.

At 232, the controller 160 commands the EPB 132 to engage axle 116b or wheels 120c/120d, then commands the park pawl system 136 to engage or disengage the park pawl 144 to lock up the transmission 112, and then commands the hydraulic brake system 124 to release its hydraulic brake pressure at a defined rate. The method 200 then ends or returns to 204. After determining that torque generation by the torque generating system 104 is occurring at 220 (e.g., engine speed above the engine speed threshold), the controller 160 determines at 236 whether the grade is greater than the grade threshold. It will be appreciated that the same or a different grade threshold could be utilized at 224 and 236. When the grade exceeds the grade threshold, the method 200 proceeds to 232, which was described above. When the grade does not exceed the grade threshold, however, the method 200 proceeds to 240. At 240, the controller 160 commands the hydraulic brake system 124 to maintain its hydraulic brake pressure for an additional period (e.g., in addition to the previous hold period), then commands the park pawl system 136 to engage or disengage the park pawl 144 to lock up the transmission 112, and then commands the hydraulic brake system 124 to release its hydraulic brake pressure at a defined rate. It will be appreciated that the defined release rates at 228, 232, and 240 could all be the same or one or more could be different. After 240, the method 200 then ends or returns to 204.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A park control system for a vehicle having a torque generating system and a transmission coupled to a driveline, the park control system comprising:
   a hydraulic brake system configured to apply braking force at each of four wheels of the driveline using a hydraulic brake pressure generated in response to depression of a brake pedal by a driver of the vehicle;
   a vacuum-independent electric brake booster configured to generate and provide additional hydraulic brake pressure to the hydraulic brake system;
   a park pawl system comprising an actuator configured to engage and disengage a park pawl to/from an output shaft of the transmission; and
   a controller configured to detect a request to engage or disengage the park pawl system and, in response to detecting the request:
      command the hydraulic brake system to maintain a first level of hydraulic brake pressure to attempt to stop a movement of the vehicle;
      when the movement of the vehicle is detected after commanding the hydraulic brake system to maintain the first level of hydraulic brake pressure, command the electric brake booster to generate and provide additional hydraulic brake pressure to the hydraulic brake system to reach a second higher level of hydraulic brake pressure that stops the movement of the vehicle;
      in response to the hydraulic brake system stopping the movement of the vehicle via the first or second levels of brake pressure, command the park pawl system to engage or disengage the park pawl to/from the transmission output shaft; and
      after the park pawl is engaged or disengaged to/from the transmission output shaft, command the hydraulic brake system to release its hydraulic brake pressure from the first or second levels of brake pressure at a defined rate.

2. The park control system of claim 1, wherein the controller is configured to command the hydraulic brake system to release its hydraulic brake pressure at the defined rate based on at least one of (i) whether the torque generating system is generating drive torque and (ii) a grade of a surface on which the vehicle resides.

3. The park control system of claim 2, wherein the controller is configured to command the hydraulic brake system to release its hydraulic brake pressure at the defined rate when the torque generating system is not generating drive torque and the grade is less than a grade threshold.

4. The park control system of claim 3, wherein the controller is further configured to command the hydraulic brake system to maintain its hydraulic brake pressure at the first or second levels of brake pressure to stop the movement of the vehicle for a period prior to commanding the hydraulic brake system to release its hydraulic brake pressure at the defined rate when the torque generating system is generating drive torque and the grade is less than the grade threshold.

5. The park control system of claim 3, wherein the vehicle further comprises an electric park brake (EPB) configured to apply braking force at two of four wheels of the driveline, and wherein the controller is further configured to command the EPB to apply braking force at the two of the four wheels of the vehicle prior to commanding the hydraulic brake system to release its hydraulic brake pressure at the defined rate when the grade is greater than the grade threshold.

6. The park control system of claim 3, wherein the grade threshold is approximately 5 percent.

7. The park control system of claim 2, wherein the torque generating system comprises an engine and the determination of whether the torque generating system is generating drive torque comprises determining whether the engine is operating above an engine speed threshold.

8. The park control system of claim 7, wherein the engine speed threshold is approximately 500 revolutions per minute.

9. The park control system of claim 1, wherein the controller is further configured to detect a set of preconditions in connection with detecting the request to engage or disengage the park pawl system, the set of preconditions comprising driver input via the brake pedal, driver input via a transmission gear selector specifying a shift into or out of park, and vehicle speed below a vehicle speed threshold.

10. The park control system of claim 1, wherein the vehicle speed threshold is approximately two kilometers per hour.

11. A park control method for a vehicle having a torque generating system and a transmission coupled to a driveline, the method comprising:
  detecting, by a controller of the vehicle, a request to engage or disengage a park pawl system comprising an actuator configured to engage and disengage a park pawl to/from an output shaft of the transmission; and
  in response to detecting the request:
    commanding, by the controller, a hydraulic brake system to maintain a first level of hydraulic brake pressure therein generated in response to depression of a brake pedal by a driver of the vehicle to attempt to stop a movement of the vehicle, wherein the hydraulic brake system is configured to apply braking force at each of four wheels of the driveline using its hydraulic brake pressure;
    when the movement of the vehicle is detected after commanding the hydraulic brake system to maintaining the first level of hydraulic brake pressure, commanding, by the controller, a vacuum-independent electric brake booster to generate and provide additional hydraulic brake pressure to the hydraulic brake system to reach a second higher level of hydraulic brake pressure that stops the movement of the vehicle;
    in response to the hydraulic brake system stopping the movement of the vehicle via the first or second levels of brake pressure, commanding, by the controller, the park pawl system to engage or disengage the park pawl to/from the transmission output shaft; and
    after the park pawl is engaged or disengaged to/from the transmission output shaft, commanding, by the controller, the hydraulic brake system to release its hydraulic pressure from the first or second levels of brake pressure at a defined rate.

12. The method of claim 11, wherein commanding the hydraulic brake system to release its hydraulic brake pressure at the defined rate is based on at least one of (i) whether the torque generating system is generating drive torque and (ii) a grade of a surface on which the vehicle resides.

13. The method of claim 12, wherein commanding the hydraulic brake system to release its hydraulic brake pressure at the defined rate is performed when the torque generating system is not generating drive torque and the grade is less than a grade threshold.

14. The method of claim 13, further comprising commanding, by the controller, the hydraulic brake system to maintain its hydraulic brake pressure at the first or second levels of brake pressure to stop the movement of the vehicle for a period prior to commanding the hydraulic brake system to release its hydraulic brake pressure at the defined rate when the torque generating system is generating drive torque and the grade is less than the grade threshold.

15. The method of claim 13, wherein the vehicle further comprises an electric park brake (EPB) configured to apply braking force at two of four wheels of the driveline, and further comprising commanding, by the controller, the EPB to apply braking force at the two of the four wheels of the vehicle prior to commanding the hydraulic brake system to release its hydraulic brake pressure at the defined rate when the grade is greater than the grade threshold.

16. The method of claim 13, wherein the grade threshold is approximately 5 percent.

17. The method of claim 12, wherein the torque generating system comprises an engine and the determination of whether the torque generating system is generating drive torque comprises determining whether the engine is operating above an engine speed threshold.

18. The method of claim 17, wherein the engine speed threshold is approximately 500 revolutions per minute.

19. The method of claim 11, further comprising detecting, by the controller, a set of preconditions in connection with detecting the request to engage or disengage the park pawl system, the set of preconditions comprising driver input via the brake pedal, driver input via a transmission gear selector specifying a shift into or out of park, and vehicle speed below a vehicle speed threshold.

20. The method of claim 11, wherein the vehicle speed threshold is approximately two kilometers per hour.

* * * * *